United States Patent
Ahn et al.

(10) Patent No.: US 11,658,339 B2
(45) Date of Patent: May 23, 2023

(54) COMPOSITION FOR GEL POLYMER ELECTROLYTE, AND GEL POLYMER ELECTROLYTE AND LITHIUM SECONDARY BATTERY INCLUDING THE SAME

(71) Applicant: LG Chem, Ltd., Seoul (KR)

(72) Inventors: Kyoung Ho Ahn, Daejeon (KR); Jung Hoon Lee, Daejeon (KR); Jae Won Lee, Daejeon (KR); Chui Haeng Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 641 days.

(21) Appl. No.: 16/638,714

(22) PCT Filed: Nov. 28, 2018

(86) PCT No.: PCT/KR2018/014837
§ 371 (c)(1),
(2) Date: Feb. 12, 2020

(87) PCT Pub. No.: WO2019/107921
PCT Pub. Date: Jun. 6, 2019

(65) Prior Publication Data
US 2020/0220212 A1    Jul. 9, 2020

(30) Foreign Application Priority Data

Nov. 28, 2017  (KR) ................. 10-2017-0160553

(51) Int. Cl.
*H01M 10/0565*   (2010.01)
*H01M 10/052*    (2010.01)

(52) U.S. Cl.
CPC ..... *H01M 10/0565* (2013.01); *H01M 10/052* (2013.01); *H01M 2300/0085* (2013.01)

(58) Field of Classification Search
None
See application file for complete search history.

(56) References Cited

U.S. PATENT DOCUMENTS

| | | |
|---|---|---|
| 10,243,239 B1 | 3/2019 | Ahn et al. |
| 2006/0240326 A1 | 10/2006 | Lee et al. |
| 2008/0081255 A1 | 4/2008 | Yamasaki et al. |
| 2011/0318645 A1 | 12/2011 | Han et al. |
| 2013/0136998 A1 | 5/2013 | Hwang et al. |
| 2015/0364794 A1 | 12/2015 | Nakazawa et al. |
| 2016/0104918 A1 | 4/2016 | Wang |
| 2017/0229735 A1 | 8/2017 | Ahn et al. |
| 2019/0334208 A1 | 10/2019 | Nakazawa et al. |

FOREIGN PATENT DOCUMENTS

| | | | |
|---|---|---|---|
| CN | 1855604 A | 11/2006 | |
| CN | 102299377 A | 12/2011 | |
| CN | 106797048 A | 5/2017 | |
| EP | 3203565 A1 | 8/2017 | |
| JP | H08-295715 A | 11/1996 | |
| JP | 2014-009282 A | 1/2014 | |
| KR | 10-2006-0110635 A | 10/2006 | |
| KR | 10-2008-0029897 A | 4/2008 | |
| KR | 10-2009-0062774 A | 6/2009 | |
| KR | 10-2012-0000399 A | 1/2012 | |
| KR | 10-2013-0058403 A | 6/2013 | |
| KR | 10-2015-0125928 A | 11/2015 | |
| KR | 10-2016-0040127 A | 4/2016 | |
| KR | 10-2016-0040128 A | 4/2016 | |
| KR | 10-2017-0044136 A | 4/2017 | |
| WO | WO-0074158 A1 * | 12/2000 | ........... C08G 64/183 |

OTHER PUBLICATIONS

Machine translation of JP H08-295715 A (Year: 1996).*
Extended European Search Report dated Jul. 16, 2020 issued by the European Patent Office in corresponding European patent application No. 18884233.0.

* cited by examiner

*Primary Examiner* — Robert S Carrico
(74) *Attorney, Agent, or Firm* — Morgan, Lewis & Bockius LLP

(57) ABSTRACT

The present invention provides a composition for a gel polymer electrolyte, including an oligomer represented by Formula 1; a polymerization initiator; a non-aqueous solvent; and a lithium salt, and a gel polymer electrolyte and a lithium secondary battery including the same.

18 Claims, No Drawings

COMPOSITION FOR GEL POLYMER ELECTROLYTE, AND GEL POLYMER ELECTROLYTE AND LITHIUM SECONDARY BATTERY INCLUDING THE SAME

CROSS-REFERENCES TO RELATED APPLICATIONS

This application is a U.S. national phase application, pursuant to 35 U.S.C. 371, of PCT/KR2018/014837, filed Nov. 28, 2018, designating the United States, which claims priority to Korean Patent Application No. 10-2017-0160553, filed on Nov. 28, 2017. The entire contents of the aforementioned patent applications are incorporated herein by this reference.

TECHNICAL FIELD

The present invention relates to a composition for a gel polymer electrolyte, which may improve the performance of a battery and a lithium secondary battery including the same, and more particularly, to a composition for a gel polymer electrolyte, which has improved conductivity and adhesion to an electrode and may improve the performance of a battery, and a gel polymer electrolyte and a lithium secondary battery including the same.

BACKGROUND ART

Recently, interests in energy storage technologies have been increasingly grown. In particular, while the application of the energy storage technologies is expanded to mobile phones, camcorders, notebook PCs, and even to electric vehicles, research and efforts for the development of the energy storage technologies have been gradually materialized.

Electrochemical devices have received most attention in the field of energy storage technologies, and there emerges an interest in rechargeable secondary batteries among these electrochemical devices.

Among the currently used secondary batteries, lithium secondary batteries, developed in the early 1990's, have been spotlighted because the lithium secondary batteries have high operating voltage and significantly high energy density.

A liquid state electrolyte, particularly, a liquid electrolyte in which a salt is dissolved in a non-aqueous organic solvent, has been mainly used in a conventional secondary battery.

However, the liquid state electrolyte is disadvantageous in that the possibilities of degrading an electrode material and volatizing the organic solvent are not only high, but safety is also low due to combustion caused by increases in ambient temperature and temperature of the battery itself. In particular, it has limitations in that gas is generated in the battery due to the decomposition of a carbonate organic solvent and/or a side reaction between the organic solvent and an electrode during charge and discharge, and thus, a thickness of the battery increases. Accordingly, the degradation of performance and safety of a battery is inevitably caused.

Generally, it is known that the safety of a battery increases in the order of liquid electrolyte <gel polymer electrolyte< solid polymer electrolyte, but on the contrary, battery performance decreases in this order. Currently, it is known that due to inferior battery performance, the solid polymer electrolyte is not commercially available yet.

On the contrary, since the gel polymer electrolyte has excellent electrochemical safety, the thickness of the battery may not only be constantly maintained, but a contact between the electrode and the electrolyte may also be excellent due to the inherent adhesion of a gel phase. As a method of preparing a secondary battery in which the gel polymer electrolyte is used, the following two methods are known.

First, a polymerizable monomer and a polymerization initiator are mixed with a liquid electrolyte in which a salt is dissolved in a non-aqueous organic solvent, to prepare a composition for forming a gel, the composition is injected into a battery including an electrode assembly in which a positive electrode, a negative electrode, and a separator are rolled or stacked, and gelation (crosslinking) is performed under appropriate temperature and time conditions to produce a battery containing a gel-type polymer electrolyte. However, the method is disadvantageous in that wetting and safety during a heating process for the gelation are low.

There is another method in which, after surfaces of the positive electrode, negative electrode, and separator are coated with a composition for a gel polymer electrolyte, gelation is performed by using heat or ultraviolet (UV) light, a battery is then manufactured by combining them, and a conventional liquid electrolyte is further injected thereinto.

However, because the method further includes the non-aqueous organic solvent, it is not satisfactory in terms of performance as well as thermal stability of the secondary battery.

In addition, the non-aqueous organic solvent and the gel polymer have different phases and separation phenomenon occurs in an electrolyte, and thus, lithium ions may not be uniformly located in the gel polymer electrolyte, thereby degrading conductivity.

Therefore, there is a need to develop a gel polymer electrolyte which may improve conductivity and the performance of a secondary battery, and has excellent adhesion to an electrode to keep safety.

(Patent Document 0001) Korean Laid-open Patent Publication No. 2015-0125928

DISCLOSURE OF THE INVENTION

Technical Problem

An aspect of the present invention for solving the above-mentioned defects provides a composition for a gel polymer electrolyte, which has improved conductivity and excellent adhesion to an electrode by improving the reactivity between a non-aqueous solvent and a polymer network formed using an oligomer, and a gel polymer electrolyte and a lithium secondary battery using the same.

Technical Solution

According to an aspect of the present invention, there is provided a composition for a gel polymer electrolyte, including an oligomer represented by the following Formula 1; a polymerization initiator; a non-aqueous solvent; and a lithium salt:

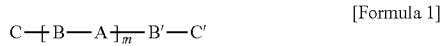

[Formula 1]

in Formula 1,

A is a unit including a polycarbonate group,

B and B' are each independently a unit including an amide group,

C and C' are each independently a unit including a (meth)acrylate group, and m is an integer of 1 to 200.

In this case, the unit A may be a unit represented by the following Formula A-1 or A-2:

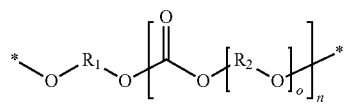
[Formula A-1]

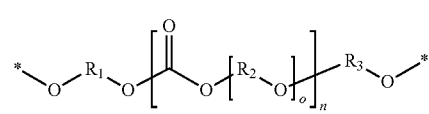
[Formula A-2]

in Formulae A-1 and A-2, $R_1$, $R_2$ and $R_3$ are each independently a substituted or unsubstituted alkylene group of 1 to 10 carbon atoms, n is an integer of 5 to 3000, and o is an integer of 0 to 5.

Meanwhile, the oligomer may include at least one compound selected from the group consisting of the compounds represented by the following Formulae 1-1 and 1-2:

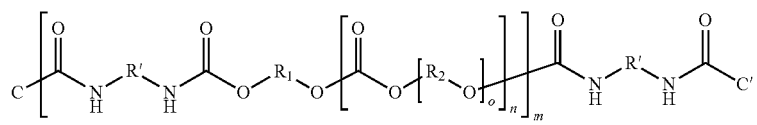
[Formula 1-1]

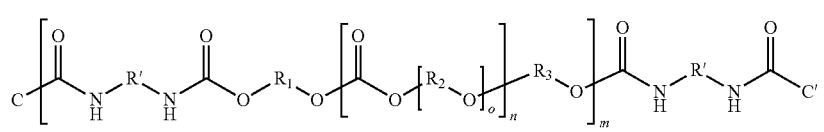
[Formula 1-2]

in Formulae 1-1 and 1-2,

C and C' are each independently a unit including a (meth)acrylate group, $R_1$, $R_2$ and $R_3$ are each independently a substituted or unsubstituted alkylene group of 1 to 10 carbon atoms, R' is at least one selected from the group consisting of a substituted or unsubstituted alkylene group of 1 to 10 carbon atoms, a substituted or unsubstituted cycloalkylene group of 3 to 10 carbon atoms, a substituted or unsubstituted bicycloalkylene group of 6 to 20 carbon atoms, a substituted or unsubstituted arylene group of 6 to 20 carbon atoms, a unit represented by the following Formula R'-1, and a unit represented by the following Formula R'-2, m is an integer of 1 to 200, n is an integer of 5 to 3000, and o is an integer of 0 to 5:

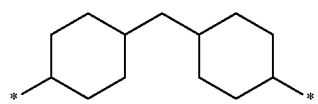
[Formula R'-1]

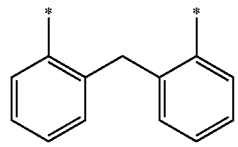
[Formula R'-2]

In another aspect, there is provided a lithium secondary battery including the gel polymer electrolyte according to the present invention.

ADVANTAGEOUS EFFECTS

The composition for a gel polymer electrolyte according to the present invention uses an oligomer including a polycarbonate group, and a gel polymer electrolyte having improved reactivity with a non-aqueous solvent and thus, improved electroconductivity of a battery may be achieved.

In addition, the composition for a gel polymer electrolyte according to the present invention has high adhesion to an electrode, and a battery having improved cycle performance and safety may be achieved.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the description are only for explaining exemplary embodiments and not intended to limit the present invention. The singular forms are intended to include the plural forms as well, unless the context clearly indicates otherwise.

It will be further understood that the terms "comprises", "comprising," or "having" when used in the description, specify the presence of stated features, numerals, steps, elements, or the combination thereof, but do not preclude the presence or addition of one or more other features, numerals, steps, elements, or the combination thereof.

Meanwhile, "*" used in the description means a connected part between the same or different atoms or between the terminal parts of a formula unless otherwise indicated in the present invention.

Composition for Gel Polymer Electrolyte

The composition for a gel polymer electrolyte according to the present invention includes an oligomer; a polymerization initiator; a non-aqueous solvent; and a lithium salt.

Oligomer

First, the oligomer will be explained.

The oligomer includes a polycarbonate group, an amide group, and a (meth)acrylate group.

Generally used gel polymer electrolytes have disadvantages in having inferior safety and mechanical properties than a solid polymer electrolyte, and having lower conductivity than a liquid electrolyte. Meanwhile, when the oligomer is used solely as an electrolyte, the control of physical properties may not be easy and the formation of a uniform polymer in a battery is difficult, and may also not be applied to large-sized high capacitance batteries. Accordingly, recently, studies on improving mechanical properties or electroconductivity using a gel polymer formed by polymerizing an oligomer are being conducted.

However, generally, a gel polymer electrolyte and a non-aqueous solvent are used together, such that the phase of the non-aqueous solvent is a liquid phase, and the phase of the gel polymer with a three-dimensional structure formed by combining the oligomer is a solid phase. Thus, due to the phase difference between the gel polymer and the non-aqueous solvent, a separating phenomenon may occur. When such separating phenomenon is generated, lithium ions may be non-uniformly located in the electrolyte, and the electroconductivity of a secondary battery may be degraded.

Therefore, an oligomer including a unit having a functional group with similar properties as the non-aqueous solvent is used in the present invention to solve such limitations.

The polycarbonate group included in the oligomer of the present invention has similar properties as the non-aqueous solvent, and may improve reactivity between the oligomer and the non-aqueous solvent. Accordingly, lithium ions may be uniformly located in an electrolyte and electroconductivity may also be improved.

In addition, the polycarbonate group has high affinity with a metal oxide, and when the gel polymer electrolyte according to the present invention is used, adhesion to an electrode which uses a metal oxide may increase, and the cycle performance and stability of a battery may be improved.

Particularly, the oligomer may be a compound represented by the following Formula 1:

$$C \!-\!\!\left[ B \!-\!A \right]_{\!m}\!\!-\! B' \!-\! C' \qquad \text{[Formula 1]}$$

in Formula 1,

A is a unit including a polycarbonate group,

B and B' are each independently a unit including an amide group,

C and C' are each independently a unit including a (meth)acrylate group, and m is an integer of 1 to 200.

Meanwhile, m may be an integer of 1 to 200, preferably, an integer of 1 to 100, more preferably, an integer of 1 to 30.

The unit A is a unit including a polycarbonate group and increasing the reactivity between the oligomer of the present invention and a non-aqueous solvent to improve the ion conductivity of an electrolyte. In addition, the polycarbonate group has high affinity with a metal oxide and may increase adhesion between an electrode using a metal oxide and an electrolyte such that the stability of a battery may be improved. More particularly, the unit A may include at least one selected from the group consisting of the units represented by the following Formulae A-1 and A-2:

$$*\!-\!\!O\!-\!\!R_1\!-\!\!O\!-\!\!\left[\!\!\stackrel{\displaystyle O}{\overset{\|}{C}}\!-\!\!O\!-\!\!\left[R_2\!-\!\!O\right]_{\!o}\right]_{\!n}\!\!-\!* \qquad \text{[Formula A-1]}$$

$$*\!-\!\!O\!-\!\!R_1\!-\!\!O\!-\!\!\left[\!\!\stackrel{\displaystyle O}{\overset{\|}{C}}\!-\!\!O\!-\!\!\left[R_2\!-\!\!O\right]_{\!o}\right]_{\!n}\!\!-\!R_3\!-\!\!O\!-\!* \qquad \text{[Formula A-2]}$$

in Formulae A-1 and A-2, $R_1$, $R_2$ and $R_3$ are each independently a substituted or unsubstituted alkylene group of 1 to 10 carbon atoms, n is an integer of 5 to 3000, and o is an integer of 0 to 5.

Meanwhile, n may preferably an integer of 5 to 2000, more preferably, an integer of 5 to 1000. When n is within the range, a viscosity for easily performing a wetting process may be secured and electrochemical stability may increase.

The units B and B' are each independently a unit including an amide group for controlling ion transfer properties and imparting mechanical properties and adhesion for accomplishing a gel polymer electrolyte.

More particularly, the polycarbonate group has high affinity with an electrode using a metal oxide, and may improve adhesion between an electrode and an electrolyte, but has relatively low reactivity with graphite series compounds and may have somewhat decreased adhesion with an electrode using graphite as the material of the electrode. Accordingly, by including an amide group having high reactivity with graphite in the oligomer together, adhesion between an electrode including the oligomer and an electrode may be controlled to a certain degree of above.

For example, the units B and B' may each independently include a unit represented by the following Formula B-1:

$$*\!-\!\!\stackrel{\displaystyle O}{\overset{\|}{C}}\!-\!\!\stackrel{\displaystyle}{\underset{\displaystyle H}{N}}\!-\!\!R'\!-\!\!\stackrel{\displaystyle}{\underset{\displaystyle H}{N}}\!-\!\!\stackrel{\displaystyle O}{\overset{\|}{C}}\!-\!* \qquad \text{[Formula B-1]}$$

in Formula B-1,

R' is at least one selected from the group consisting of a linear or nonlinear alkylene group of 1 to 10 carbon atoms, a substituted or unsubstituted cycloalkylene group of 3 to 10 carbon atoms, a substituted or unsubstituted bicycloalkylene group of 6 to 20 carbon atoms, a substituted or unsubstituted arylene group of 6 to 20 carbon atoms, a unit represented by the following Formula R'-1, and a unit represented by the following Formula R'-2:

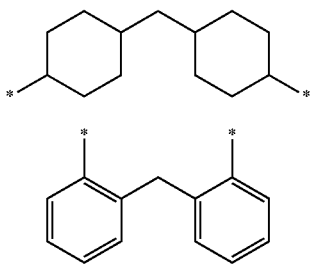
[Formula R'-1]

[Formula R'-2]

In another embodiment, in Formula B-1,
R' may include at least one among the units represented by the following R'-3 to R'-8:

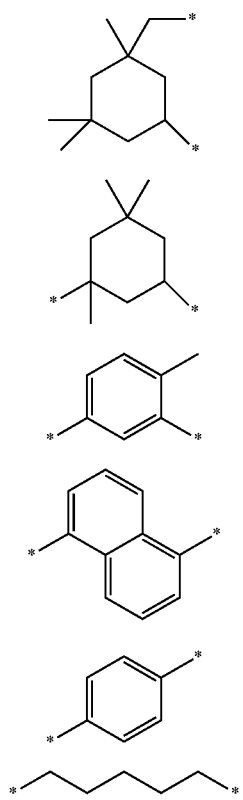

[Formula R'-3]

[Formula R'-4]

[Formula R'-5]

[Formula R'-6]

[Formula R'-7]

[Formula R'-8]

Meanwhile, the units C and C' are each independently a unit including a (meth)acrylate group so that oligomers are combined into a three-dimensional structure to form a polymer network. The units C and C' may be derived from a monomer including a monofunctional or polyfunctional (meth)acrylate or (meth)acrylic acid.

For example, the units C and C' may be each independently selected from the units represented by the following Formulae C-1 to C-5:

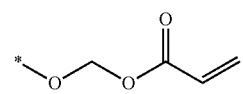

[Formula C-1]

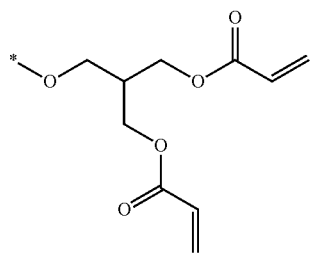

[Formula C-2]

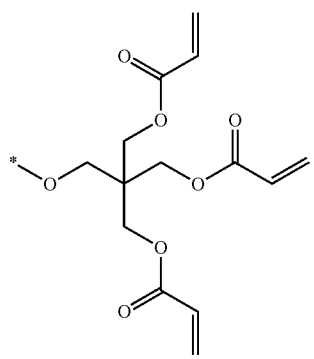

[Formula C-3]

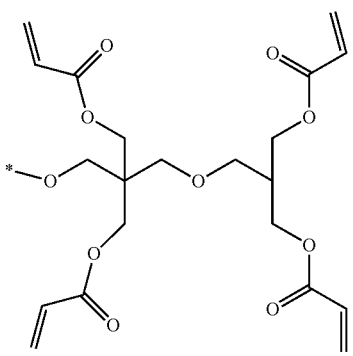

[Formula C-4]

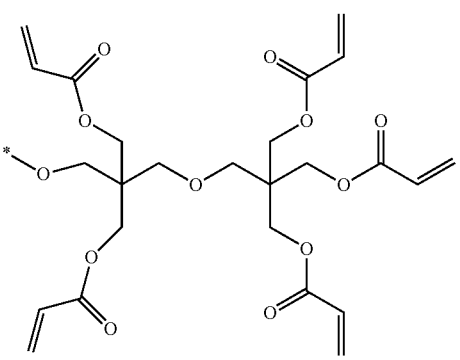

[Formula C-5]

For example, according to an embodiment of the present invention, the oligomer forming the polymer network may be a compound selected from the group consisting of the compounds represented by the following Formulae 1-1 and 1-2:

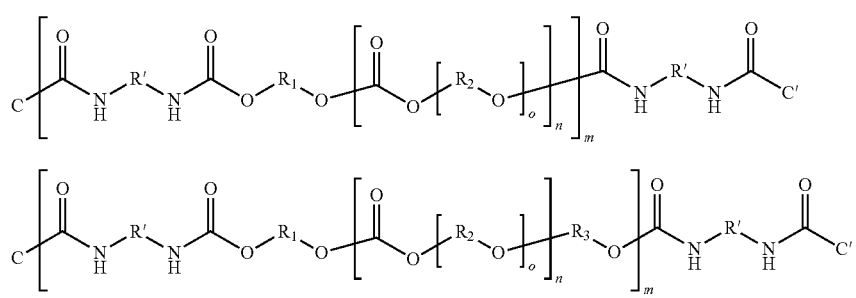
[Formula 1-1]

[Formula 1-2]

in Formulae 1-1 and 1-2,

C and C' are each independently a unit including a (meth)acrylate group, where the explanation on the units C and C' are the same as described above.

$R_1$, $R_2$ and $R_3$ are each independently a substituted or unsubstituted alkylene group of 1 to 10 carbon atoms, R' is at least one selected from the group consisting of a substituted or unsubstituted alkylene group of 1 to 10 carbon atoms, a substituted or unsubstituted cycloalkylene group of 3 to 10 carbon atoms, a substituted or unsubstituted bicycloalkylene group of 6 to 20 carbon atoms, a substituted or unsubstituted arylene group of 6 to 20 carbon atoms, a unit represented by Formula R'-1, and a unit represented by Formula R'-2, m is an integer of 1 to 200, n is an integer of 5 to 3000, and o is an integer of 0 to 5.

In another embodiment, R' may include at least one among the units represented by Formulae R'-3 to R'-8 above. In this case, the explanation on the units represented by Formulae R'-3 to R'-8 are the same as described above.

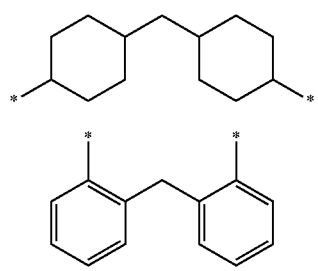
[Formula R'-1]

[Formula R'-2]

Meanwhile, m may be an integer of 1 to 200, preferably, an integer of 1 to 100, more preferably, an integer of 1 to 30.

n may be an integer of 5 to 3000, preferably, 5 to 2000, more preferably, 5 to 1000. If n is within the range, a viscosity with a degree for easily performing a wetting process may be secured, and electrochemical stability may be increased.

More particularly, the oligomer of the present invention may be a compound represented by the following Formula 1-3:

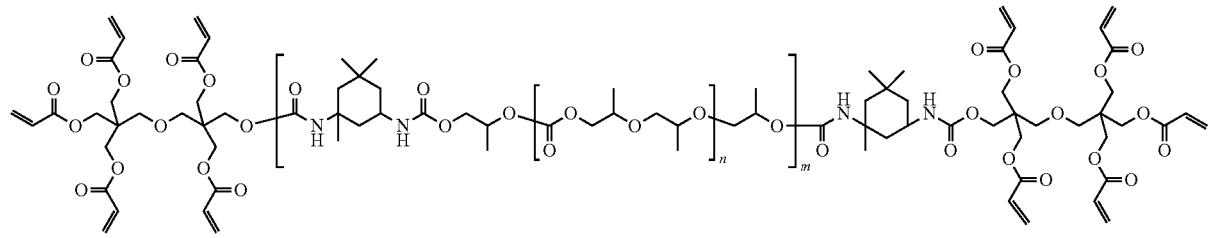
[Formula 1-3]

in Formula 1-3, m is an integer of 1 to 200, and n is an integer of 5 to 3000.

Meanwhile, m may preferably be an integer of 1 to 100, more preferably, an integer of 1 to 30.

In addition, n may preferably be an integer of 5 to 2000, more preferably, an integer of 5 to 1000. When n is within the range, a viscosity with a degree for easily performing a wetting process may be secured, and electrochemical stability may be increased.

Meanwhile, the oligomer may be included in an amount of 0.5 parts by weight to 90 parts by weight, preferably, 0.5 parts by weight to 85 parts by weight, more preferably, 0.5 parts by weight to 80 parts by weight with respect to 100 parts by weight of an electrolyte composed of a non-aqueous solvent and a lithium salt. When the amount of the oligomer satisfies this range, a viscosity, strength and ion conductivity may be secured to certain degrees or above so as to be applied to a battery.

In addition, according to an embodiment of the present invention, the weight average molecular weight (Mw) of the oligomer represented by Formula 1 may be controlled by the number of a repeating unit, and may be about 1,000 to 500,000, particularly, 2,000 to 20,000, more particularly, 2,000 to 10,000. When the molecular weight of the oligomer is within the range, the mechanical strength of a battery including the same may be efficiently improved. In this case, the weight average molecular weight in the description may mean a conversion value with respect to standard polystyrene measured by gel permeation chromatograph (GPC).

Unless otherwise defined, a molecular weight may mean a weight average molecular weight. For example, the weight average molecular weight is measured using 1200 series of Agilent Co., and a column used may be a PL mixed B column of Agilent Co., and a solvent may use tetrahydrofuran (THF).

Meanwhile, the composition for a gel polymer electrolyte according to the present invention may further include a monomer in addition to the oligomer to increase mechanical properties.

The monomer may include at least one functional group selected from the group consisting of an acrylate group, a vinyl group, an epoxy group, an amino group, an amide group, an imide group, a hydroxyl group, a methylol group and a carboxyl group, more preferably, two or more acrylate groups.

For example, the monomer may be acrylate or erythritol, more particularly, dipentaerythritol pentaacrylate, triacrylate, pentaacrylate, and the like.

The monomer may be 5 parts by weight to 50 parts by weight, more preferably, 10 parts by weight to 30 parts by weight with respect to 100 parts by weight of the oligomer. When the monomer content is within the range, the monomer may play the role of a crosslinking agent during forming a polymer network of a three-dimensional structure together with the oligomer, and the mechanical properties or thermal stability of an electrolyte may be kept to a certain degree or more and residual amount in the electrolyte may be minimized to prevent the degradation of battery performance.

Polymerization Initiator

Then, the polymerization initiator will be explained.

The polymerization initiator is for initiating the polymerization reaction of the oligomer included in the composition for a gel polymer electrolyte of the present invention.

As the polymerization initiator, for example, organic peroxides or hydroperoxides such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and azo compounds such as 2,2'-azobis(2-cyanobutane), 2,2'-azobis(methylbutyronitrile), 2,2'-azobis(isobutyronitrile) (AIBN), and 2,2'-azobisdimethyl-valeronitrile (AMVN), may be used, but the present invention is not limited thereto.

The polymerization initiator may form radicals by being decomposed by heat, for a non-limiting example, at a temperature of 30° C. to 100° C., or by being decomposed at room temperature (5° C. to 30° C.), and an oligomer and an acrylate compound may react by free radical polymerization to form a gel polymer electrolyte.

Meanwhile, the polymerization initiator may be included in an amount of 0.01 part by weight to 5 parts by weight, preferably, 0.05 parts by weight to 5 parts by weight, more preferably, 0.1 parts by weight to 5 parts by weight based on 100 parts by weight of the oligomer. When the amount of the polymerization initiator is within the range, gelation may be appropriately carried out during injecting the composition for a gel polymer electrolyte into a battery, and the amount of an unreacted polymerization initiator which may adversely affect battery performance may be minimized. In addition, when the polymerization initiator is included within the range, gelation may be appropriately performed.

Non-Aqueous Solvent

Then, a non-aqueous solvent will be explained.

In the present invention, the non-aqueous solvent may use an electrolyte solvent commonly used in a lithium secondary battery, for example, an ether, an ester (acetates, propionates), an amine, a linear carbonate, a cyclic carbonate, a nitrile (acetonitrile, SN, etc.), and these compounds may be used alone or as a mixture of two or more.

Typically, a carbonate-based electrolyte solvent including a carbonate compound, which is a cyclic carbonate, a linear carbonate or a mixture thereof, may be used.

In the present invention, though the above-exemplified electrolyte solvents are used as the non-aqueous solvent, a polycarbonate group which has similar properties as the non-aqueous solvent is included in the oligomer, and separating phenomenon due to phase difference between a polymer network in which the oligomer is bonded and the non-aqueous solvent may be suppressed. In this case, lithium ions may be uniformly located in the electrolyte, and electroconductivity may be improved. Particular examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and the halides thereof, or a mixture of two or more thereof. In addition, particular examples of the linear carbonate compound may be any one selected from the group consisting of dimethyl carbonate (DMC), diethyl carbonate (DEC), dipropyl carbonate (DPC), ethyl methyl carbonate (EMC), methyl propyl carbonate and ethyl propyl carbonate (EPC), or a mixture of two or more thereof, without limitation.

Particularly, propylene carbonate and ethylene carbonate, which are cyclic carbonates in the carbonate-based electrolyte solvent, are organic solvents having high viscosity, have high dielectric constant and dissociate lithium salts in an electrolyte well, and may preferably be used. When such cyclic carbonate and a linear carbonate with low viscosity and low dielectric constant such as ethyl methyl carbonate, diethyl carbonate and dimethyl carbonate are mixed in an appropriate ratio and used, an electrolyte having high electroconductivity may be prepared and may preferably be used.

In addition, the ester among the electrolyte solvent may be any one selected from the group consisting of methyl acetate, ethyl acetate, propyl acetate, methyl propionate, ethyl propionate, γ-butyrolactone, γ-valerolactone, γ-caprolactone, α-valerolactone, and ε-caprolactone, or a mixture of two or more thereof, without limitation.

Lithium Salt

Next, the lithium salt will be explained.

The lithium salt is used as an electrolyte salt in a lithium secondary battery and is used as a medium for transferring ions. Typically, the lithium salt may include at least one compound selected from the group consisting of $LiPF_6$, $LiBF_4$, $LiSbF_6$, $LiAsF_6$, $LiClO_4$, $LiN(C_2F_5SO_3)_2$, $LiN(CF_3SO_2)_2$, $CF_3SO_3Li$, $LiC(CF_3SO_2)_3$, $LiC_4BO_8$, LiTFSI, LiFSI, and $LiClO_4$, and preferably, may include $LiPF_6$ or LiFSI, without limitation.

Meanwhile, the lithium salt may be used in a concentration range of 0.5 M to 5.0 M. When the amount of the lithium salt satisfies the above range, ion transfer properties and ion concentration, by which a battery may be operated at room temperature may be kept.

Additive

The composition for a gel polymer electrolyte according to an embodiment of the present invention may further include various additives in addition to the above-described components to adjust the physical properties.

For example, the composition for a gel polymer electrolyte according to the present invention may further include as an additive, a compound selected from the group consisting of a compound represented by the following Formula 2-1, a compound represented by the following Formula, 2-2 and the derivatives thereof.

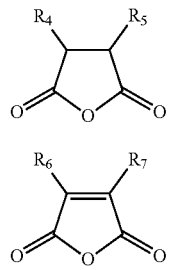

[Formula 2-1]

[Formula 2-2]

in Formulae 2-1 and 2-2

$R_4$ to $R_7$ are the same or different and are each independently hydrogen, halogen, a substituted or unsubstituted, linear or nonlinear alkyl group of 1 to 10 carbon atoms, a substituted or unsubstituted alkoxy group of 1 to 10 carbon atoms, or a substituted or unsubstituted alkenyl group of 2 to 10 carbon atoms.

The compounds represented by Formula 2-1 and/or Formula 2-2, or the derivatives thereof have surface-active effect, and when the compound is included, the dispersibility of a composition may be improved. In addition, when compounds represented by Formula 2-1 and/or Formula 2-2, or the derivatives thereof are included, the production of gas from an electrode may be suppressed and uncharged region in a battery may be decreased.

In addition, the gel polymer electrolyte according to the present invention may further include, for example, a compound such as vinylene carbonate (VC), vinyl ethylene carbonate (VEC), Propane sultone, succinonitrile (SN), adiponitrile (AdN), ethylene sulfate (ESa), propene sultone (PRS), fluoroethylene carbonate (FEC), $LiPO_2F_2$, lithium difluorooxalatoborate (LiODFB), lithium bis-(oxalato)borate (LiBOB), 3-trimethoxysilanyl-propyl-N-aniline (TMSPa), tris(trimethylsilyl) phosphite (TMSPi), as an additive, as necessary. These compounds may be used alone or as a mixture of two or more.

Also, the gel polymer electrolyte according to the present invention may further include an inorganic particle, as necessary. As the inorganic particle, a single material selected from the group consisting of $BaTiO_3$ having a dielectric constant of 5 or greater, $BaTiO_3$, $Pb(Zr,Ti)O_3$ (PZT), $Pb_{1-a}La_aZr_{1-b}Ti_bO_3$ (PLZT, where $0<a<1$, $0<b<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof, or a mixture of two or more thereof, may be used.

Besides, inorganic particles having lithium ion transfer ability, that is, lithium phosphate ($Li_3PO_4$), lithium titanium phosphate ($Li_cTi_d(PO_4)_3$, $0<c<2$, $0<d<3$), lithium aluminum titanium phosphate ($Li_{a1}Al_{b1}Ti_{c1}(PO_4)_3$, $0<a1<2$, $0<b1<1$, $0<c1<3$), (LiAlTiP)$_{a2}O_{b2}$-based glass ($0<a2<4$, $0<b2<13$) such as $14Li_2O$-$9Al_2O_3$-$38TiO_2$-$39P_2O_5$, lithium lanthanum titanate ($Li_{a3}La_{b3}TiO_3$, $0<a3<2$, $0<b3<3$), lithium germanium thiophosphate ($Li_{a4}Ge_{b4}P_{c2}S_d$, $0<a4<4$, $0<b4<1$, $0<c2<1$, $0<d<5$) such as $Li_{3.25}Ge_{0.25}P_{0.75}S_4$, lithium nitride ($Li_{a5}N_{b5}$, $0<a5<4$, $0<b5<2$) such as $Li_3N$, $SiS_2$-based glass ($Li_{a6}Si_{b6}S_{c3}$, $0<a6<3$, $0<b6<2$, $0<c3<4$) such as $Li_3PO_4$—$Li_2S$—$SiS_2$, $P_2S_5$-based glass ($Li_{a7}P_{b7}S_{c5}$, $0<a7<3$, $0<b7<3$, $0<c5<7$), such as LiI—$Li_2S$—$P_2S_5$, or a mixture thereof may be further included.

Gel Polymer Electrolyte

Hereinafter, the gel polymer electrolyte according to the present invention will be explained.

According to an embodiment of the present invention, a gel polymer electrolyte is prepared using the composition for a gel polymer electrolyte.

The conventional gel polymer electrolyte has lower electroconductivity than a liquid electrolyte and has relatively inferior stability and mechanical properties when compared with a solid polymer electrolyte.

However, in the gel polymer electrolyte according to the present invention, a polymer network is formed using an oligomer represented by Formula 1 which includes unit A including a polycarbonate group, units B and B' each independently including an amide group, and units C and C' each independently including a (meth)acrylate group, and thus may improve electroconductivity and mechanical properties.

Particularly, since the oligomer includes a polycarbonate group having similar properties as a non-aqueous solvent, separating phenomenon due to phase difference between the non-aqueous solvent and the oligomer may be suppressed. In this case, lithium ions may be uniformly located in an electrolyte and the electroconductivity of a battery may be improved.

For example, the gel polymer electrolyte according to the present invention is formed by polymerizing a composition for a gel polymer electrolyte according to a commonly well-known method in the art. More particularly, the gel polymer electrolyte may be formed by in-situ polymerization of the composition for a gel polymer electrolyte in a secondary battery.

More particularly, the gel polymer electrolyte may be prepared by (a) inserting an electrode assembly composed of a positive electrode, a negative electrode, and a separator disposed between the positive electrode and the negative electrode into a battery case, and (b) injecting the composition for a gel polymer electrolyte according to the present invention into the battery case and polymerizing the composition.

An in-situ polymerization reaction in the lithium secondary battery may be performed by using electron beam (E-beam), γ-ray, and room temperature or high temperature aging processes, and, according to an embodiment of the present invention, the in-situ polymerization reaction may be performed by thermal polymerization. In this case, polymerization time required may be in a range of about 2 minutes to about 12 hours, and thermal polymerization temperature may be in a range of 30° C. to 100° C.

More particularly, in the in-situ polymerization reaction in the lithium secondary battery, predetermined amounts of the polymerization initiator and the oligomer are added to the electrolyte containing a lithium salt and mixed, and the mixture is then injected into a battery cell. After sealing an electrolyte injection hole of the battery cell, polymerization is then performed by heating the battery cell to 40° C. to 80° C. for 1 hour to 20 hours, and the lithium salt-containing composition is gelated to prepare a gel polymer electrolyte into a gel type.

As another method, there is a method in which, after a polymerization initiator and certain amount of the oligomer are added to an electrolyte including the lithium salt and mixed, one surface of an electrode and a separator is coated with the resultant product, gelation is performed by using heat or ultraviolet (UV) light, an electrode assembly is manufactured by rolling or stacking an electrode on which a gel polymer electrolyte is formed and/or a separator, the electrode assembly is then inserted in a battery case, and a conventional liquid electrolyte is further injected thereinto.

Lithium Secondary Battery

Then, a lithium secondary battery according to the present invention will be explained. A secondary battery according to another embodiment of the present invention includes a positive electrode, a negative electrode, a separator disposed between the positive electrode and the negative electrode, and a gel polymer electrolyte. The explanation on the gel polymer electrolyte is the same as described above, and particular explanation thereof will be omitted.

Positive Electrode

The positive electrode may be manufactured by coating a positive electrode collector with a positive electrode mixture slurry including a positive electrode active material, a binder, a conductive agent and a solvent.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with carbon, nickel, titanium, silver, or the like may be used.

The positive electrode active material is a compound capable of reversibly intercalating and deintercalating lithium, and may include particularly, a lithium composite metal oxide including one or more metals such as cobalt, manganese, nickel and aluminum, and lithium. More particularly, the lithium composite metal oxide may include a lithium-manganese-based oxide (for example, $LiMnO_2$, $LiMn_2O_4$, etc.), a lithium-cobalt-based oxide (for example, $LiCoO_2$, etc.), a lithium-nickel-based oxide (for example, $LiNiO_2$, etc.), a lithium-nickel-manganese-based oxide (for example, $LiNi_{1-Y1}Mn_{Y1}O_2$ (where $0<Y1<1$), $LiMn_{2-Z1}Ni_{Z1}O_4$ (where $0<Z1<2$), etc.), a lithium-nickel-cobalt-based oxide (for example, $LiNi_{1-Y2}Co_{Y2}O_2$ (where $0<Y2<1$), etc.), a lithium-manganese-cobalt-based oxide (for example, $LiCo_{1-Y3}Mn_{Y3}O_2$ (where $0<Y3<1$), $LiMn_{2-Z2}Co_{Z2}O_4$ (where $0<Z2<2$), etc.), a lithium-nickel-manganese-cobalt-based oxide (for example, $Li(Ni_{p1}Co_{q1}Mn_{r1})O_2$ (where $0<p1<1$, $0<q1<1$, $0<r1<1$, $p1+q1+r1=1$), $Li(Ni_{p2}Co_{q2}Mn_{r2})O_4$ (where $0<p2<2$, $0<q2<2$, $0<r2<2$, $p2+q2+r2=2$), etc.), or a lithium-nickel-cobalt-transition metal (M) oxide (for example, $Li(Ni_{p3}Co_{q3}Mn_{r3}M_{s1})O_2$ (where M is selected from the group consisting of Al, Fe, V, Cr, Ti, Ta, Mg and Mo, p3, q3, r3 and s1 are atomic fractions of each independent element, and $0<p3<1$, $0<q3<1$, $0<r3<1$, $0<s1<1$, $p3+q3+r3+s1=1$), and one of them or a compound of two or more thereof may be included.

In respect of increasing the capacity characteristics and stability of a battery, the lithium composite metal oxide may be $LiCoO_2$, $LiMnO_2$, $LiNiO_2$, lithium nickelmanganesecobalt oxide (for example, $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or lithium nickelcobaltaluminum oxide (for example, $LiNi_{0.8}Co_{0.15}Al_{0.05}O_2$, etc.), etc., and in respect of the remarkable improving effect according to the control of the kind and amount ratio of configuration elements which form the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, etc., and any one of them or a mixture of two or more thereof may be used.

The positive electrode active material may be included in an amount of 80 wt % to 99 wt %, more preferably, 85 wt % to 99 wt %, more preferably, 90 wt % to 98 wt %, based on the total solid content of the positive electrode mixture slurry excluding the solvent.

The binder is a component assisting the adhesion between the active material and the conductive agent, and the adhesion to the current collector, and is commonly included in an amount of 1 wt % to 20 wt %, preferably, 1 wt % to 15 wt %, more preferably, 1 to 10 wt % based on the total solid content of the positive electrode mixture slurry excluding the solvent. Examples of the binder may be polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene (PE), polypropylene, an ethylene-propylene-diene terpolymer (EPDM), a sulfonated EPDM, a styrene-butadiene rubber, a fluorine rubber, or various copolymers.

The conductive agent is a component to further increase the conductivity of the positive electrode active material, and may be included in an amount of 1 wt % to 20 wt %, preferably, 1 wt % to 15 wt %, more preferably, 1 to 10 wt % based on the total solid content of the positive electrode mixture slurry excluding the solvent.

Any conductive agent may be used without particular limitation as long as it has conductivity without causing adverse chemical changes in the battery. For example, the conductive agent may be graphite; carbon-based materials such as carbon black, acetylene black, Ketjen black, channel black, furnace black, lamp black, and thermal black; conductive fibers such as carbon fibers and metal fibers; metal powder such as carbon fluoride powder, aluminum powder, and nickel powder; conductive whiskers such as zinc oxide whiskers and potassium titanate whiskers; conductive metal oxides such as titanium oxide; or conductive materials such as polyphenylene derivatives. Particular commercial examples of the conductive agent include acetylene black series of Chevron Chemical Company, Denka Singapore Private Limited, Gulf Oil Company, etc., Ketjen black series, EC series (Armak Company), VULCAN XC-72 (Cabot Company) and SUPER P (Timcal Co.), and the like.

The solvent may include an organic solvent such as N-methyl-2-pyrrolidone (NMP), and may be used in an amount achieving preferable viscosity if the positive electrode active material, and selectively the binder and the conductive agent are included. For example, the solvent may be included such that the concentration of the solid content including the positive electrode active material, and selectively the binder and the conductive agent may be 50 wt % to 95 wt %, preferably, 70 wt % to 95 wt %, more preferably, 70 wt % to 90 wt %.

Negative Electrode

In addition, the negative electrode may be manufactured by applying a negative electrode mixture slurry including a negative electrode active material, a binder, a conductive agent and a solvent on a negative electrode collector.

The negative electrode collector generally has a thickness of 3 to 500 μm. The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with carbon, nickel, titanium, silver, or the like, and an aluminum-cadmium alloy may be used. Also, similar to the positive electrode collector, microscopic irregularities may be formed on the surface of the collector to improve the adhesion of a negative electrode active material. The negative electrode collector may be used in various shapes such as a film, a sheet, a foil, a net, a porous body, a foam body, a non-woven fabric body, and the like.

The negative electrode active material may include one kind selected from the group consisting of natural graphite, artificial graphite, a carbonaceous material; a metallic compound (Me) such as a lithium-containing titanium composite oxide (LTO), Si, Sn, Li, Zn, Mg, Cd, Ce, Ni and Fe; an alloy of the metallic compound (Me); an oxide (MeOx) of the metallic compound (Me); and a composite of the metallic compound and carbon.

The negative electrode active material may be included in an amount of 80 wt % to 99 wt %, preferably, 85 wt % to 99 wt %, more preferably, 90 wt % to 98 wt % based on a total solid content of the negative electrode mixture slurry excluding the solvent.

The binder is a component that assists the adhesion between the conductive agent, the active material, and the current collector, and is added in an amount of 1 wt % to 20 wt %, preferably, 1 wt % to 15 wt %, more preferably, 1 wt % to 10 wt % based on the total solid content of the negative electrode mixture slurry excluding the solvent.

Examples of the binder may be polyvinylidene fluoride (PVDF), polyvinyl alcohol, carboxymethyl cellulose (CMC), starch, hydroxypropyl cellulose, regenerated cellulose, polyvinylpyrroli done, tetrafluoro ethyl ene, polyethylene, polypropylene, an ethyl ene-prop yl ene-diene polymer (EPDM), a sulfonated-EPDM, a styrene-butadiene rubber, a fluorine rubber, and various copolymers thereof.

The conductive agent is a component for additionally improving conductivity of the negative electrode active material. The conductive agent may be added in an amount of 1 wt % to 20 wt %, preferably, 1 wt % to 15 wt %, more preferably, 1 wt % to 10 wt % based on the total solid content of the negative electrode mixture slurry excluding the solvent. The conductive agent is not particularly limited as long as it has conductivity without causing adverse chemical changes in the battery. For example, a conductive material such as graphite such as natural graphite and artificial graphite; carbon black such as acetylene black, Ketjen black, channel black, furnace black, lamp black, and thermal black; conductive fibers such as carbon fibers and metal fibers; metal powder such as carbon fluoride powder, aluminum powder, and nickel powder; conductive whiskers such as zinc oxide whiskers and potassium titanate whiskers; conductive metal oxide such as titanium oxide; or a conductive material such as polyphenylene derivatives, may be used.

The solvent may include water or an organic solvent such as N-methyl-2-pyrrolidone (NMP), in an amount of achieving preferable viscosity with the inclusion of the negative electrode active material, and selectively a binder, a conductive agent, etc. For example, the solvent may be included such that the solid content of the negative electrode active material, selectively including a binder and a conductive agent may become 50 wt % 90 wt %, preferably, 70 wt % to 90 wt %.

Separator

In addition, the separator may be any separator as long as it is commonly used as the conventional separator. For example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, may be used alone, or a stacked structure having two or more layers thereof may be used. Also, a typical porous nonwoven fabric, for example, a nonwoven fabric formed of high melting point glass fibers or polyethylene terephthalate fibers may be used, without limitation.

The shape of the lithium secondary battery of the present invention is not particularly limited, but a cylindrical type using a can, a prismatic type, a pouch type, or a coin type may be used.

According to another embodiment of the present invention, a battery module including the lithium secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, the present invention will be described in more detail referring to preferred embodiments. However, the embodiments are only for assisting the understanding of the present invention and should not be construed to limit the scope of the present invention. It would be obvious for a person skilled in the art that various changes and modifications are apparent within the scope of this description and the technical spirit and such changes and modifications definitely are included in the scope of the attached claims.

EXAMPLES

1. Example 1

(1) Preparation of Composition for Gel Polymer Electrolyte

An electrolyte was prepared by dissolving $LiPF_6$ in a non-aqueous solvent having a weight ratio of ethylene carbonate (EC):propylene carbonate (PC):ethyl methyl carbonate (EMC)=3:2:5 so as to attain 1 M concentration. 5 parts by weight of an oligomer (Formula 1-3, n=10, m=9) was added to 100 parts by weight of the electrolyte. Then, 0.2 parts by weight of a polymerization initiator (2,2'-azobis (iso-butyronitrile, AIBN) and 40 parts by weight of an additive (VC) were added based on 100 parts by weight of the oligomer to prepare a composition for a gel polymer electrolyte.

(2) Manufacture of Lithium Secondary Battery

To a N-methyl-2-pyrrolidone (NMP) solvent, $LiCoO_2$ as a positive electrode active material, carbon black as a conductive agent, and polyvinylidene fluoride (PVdF) as a binder were added in amounts of 96 parts by weight, 2 parts by weight and 2 parts by weight, respectively, to prepare a positive electrode mixture slurry. An about 20 μm thick aluminum (Al) thin film, as a positive electrode collector, was coated with the positive electrode mixture slurry and dried, and the coated Al thin film was then roll-pressed to manufacture a positive electrode.

A carbon powder as a negative electrode active material, styrene-butadiene rubber (SBR) as a binder, CMC as a viscosity increasing agent, and carbon black as a conductive agent, were mixed in a weight ratio of 96.3:1:1.5:1.2 and added to an NMP solvent to prepare a negative electrode mixture slurry. A 10 μm thick copper (Cu) thin film, as a negative electrode collector, was coated with the negative electrode mixture slurry and dried, and the coated Cu thin film was then roll-pressed to manufacture a negative electrode.

A battery was assembled by using the positive electrode, the negative electrode, and a separator formed of three layers of polypropylene/polyethylene/polypropylene (PP/PE/PP), and the composition for a gel polymer electrolyte thus prepared was injected into the assembled battery. After storing the battery for 2 days, the battery was heated at 70° C. for 5 hours to manufacture a lithium secondary battery including a gel polymer electrolyte.

2. Example 2

A composition for a gel polymer electrolyte and a lithium secondary battery were manufactured by the same method as in Example 1 except for further including 14 parts by weight of hexylacrylate as a monomer with respect to 100 parts by weight of the oligomer.

Comparative Examples

Comparative Example 1

(1) Preparation of Electrolyte

An electrolyte was prepared by dissolving $LiPF_6$ in an organic solvent including ethylene carbonate (EC):propylene carbonate (PC):ethyl methyl carbonate (EMC)=3:2:5 in a weight ratio so as to obtain 1 M concentration.

(2) Manufacture of Lithium Secondary Battery

To a N-methyl-2-pyrrolidone (NMP) solvent, $LiCoO_2$ as a positive electrode active material, carbon black as a conductive agent, and polyvinylidene fluoride (PVdF) as a binder were added in amounts of 96 parts by weight, 2 parts by weight and 2 parts by weight, respectively, to prepare a positive electrode mixture slurry. An about 20 μm thick aluminum (Al) thin film, as a positive electrode collector, was coated with the positive electrode mixture slurry and dried, and the coated Al thin film was then roll-pressed to manufacture a positive electrode.

A carbon powder as a negative electrode active material, styrene-butadiene rubber (SBR) as a binder, CMC as a viscosity increasing agent, and carbon black as a conductive agent, were mixed in a weight ratio of 96.3:1:1.5:1.2 and added to an NMP solvent, to prepare a negative electrode mixture slurry. A 10 μm thick copper (Cu) thin film, as a negative electrode collector, was coated with the negative electrode mixture slurry and dried, and the coated Cu thin film was then roll-pressed to manufacture a negative electrode.

A battery was assembled using the positive electrode, the negative electrode, and a separator formed of three layers of polypropylene/polyethylene/polypropylene (PP/PE/PP). Into the assembled battery, the non-aqueous electrolyte was injected and then stored at room temperature for 2 days to manufacture a lithium secondary battery.

Comparative Example 2

(1) Preparation of Composition for Gel Polymer Electrolyte

An electrolyte was prepared by dissolving LiPF6 in a non-aqueous solvent having a composition of ethylene carbonate (EC):ethyl methyl carbonate (EMC)=3:7 (volume ratio) so as to attain 1 M concentration. A composition for a gel polymer electrolyte was prepared by the same method as in Example 1 except for using a monomer represented by Formula 3 below instead of using the oligomer of Example 1 in the electrolyte.

[Formula 3]

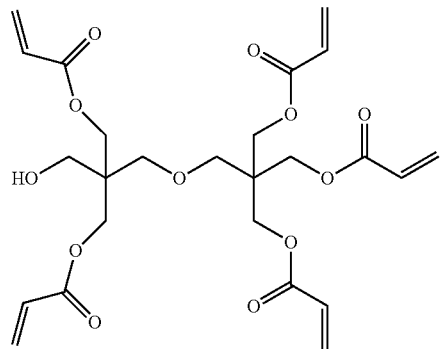

(2) Manufacture of Secondary Battery

A lithium secondary battery was manufactured by the same method for manufacturing the lithium secondary battery in Example 1 except for using the composition for a gel polymer electrolyte prepared in Comparative Example 2 instead of using the composition for a gel polymer electrolyte prepared in Example 1.

Experimental Examples

Experimental Example 1. Evaluation of Battery Resistance

In order to evaluate the resistance of the lithium secondary batteries manufactured according to Examples 1-2 and Comparative Examples 1-2, the lithium secondary batteries thus manufactured were activated, charged to a state of charge (SOC) of 50%, and discharged at conditions of 25 C for 10 seconds, and then, resistance was measured. The results are listed in Table 1 below.

TABLE 1

| | Resistance (mΩ) |
|---|---|
| Example 1 | 20 |
| Example 2 | 21 |
| Comparative Example 1 | 15 |
| Comparative Example 2 | 40 |

Different from the Examples, Comparative Example 1 used a liquid electrolyte, and the resistance was relatively low. However, referring to the experiments below, adhesion to an electrode and the capacity retention of a battery were found low. Meanwhile, Comparative Example 2 using the same kind of a gel polymer electrolyte was found to have high resistance when compared with the Examples.

Experimental Example 2. Evaluation of Adhesion of Electrode

In order to evaluate the adhesion of an electrode of a lithium secondary battery, the lithium secondary batteries manufactured according to Examples 1-2 and Comparative Examples 1-2 were disassembled, and positive electrodes and separators were cut into 70 mm (length)×25 mm (width) to prepare specimens. The specimen thus prepared was attached and fixed to a glass plate using a double-sided adhesive tape so that the positive electrode faced the glass plate. The separator part of the specimen was exfoliated at 25° C. in a rate of 25 mm/min at an angle of 180°, and the strength at this point was evaluated as adhesion and shown in Table 2 below.

TABLE 2

|  | Adhesion (gf/10 mm) |
| --- | --- |
| Example 1 | 50 |
| Example 2 | 45 |
| Comparative Example 1 | 15 |
| Comparative Example 2 | 20 |

According to Experimental Example 2, the adhesion of the electrodes of the lithium secondary batteries manufactured according to the Examples was greater than the adhesion of the electrodes of the lithium secondary batteries manufactured according to the Comparative Examples.

Experimental Example 3. Evaluation of Capacity Retention

In order to evaluate the capacity retention of the electrodes of the lithium secondary batteries, charging and discharging were performed with respect to the lithium secondary batteries manufactured according to Examples 1-2 and Comparative Examples 1-2 at a temperature of 45° C. according to the conditions below.

Charging conditions: (1 C) CC (constant current)/CV (constant voltage), (4.25 V, 0.02 C current cut-off)

Discharging conditions: (1 C) CC (constant current) conditions 3 V

On the basis of 1 cycle by which charging and discharging are performed once for each, capacity retention was measured after performing 200 cycles and shown with respect to the capacity at an initial state (1 cycle) in Table 3 below.

TABLE 3

|  | Capacity retention based on 200 cycle (%) |
| --- | --- |
| Example 1 | 97 |
| Example 2 | 98 |
| Comparative Example 1 | 95 |
| Comparative Example 2 | 80 |

According to Experimental Example 3, the capacity retention of the Examples was found to be improved than the capacity retention of the Comparative Examples.

The invention claimed is:

1. A composition for a gel polymer electrolyte, comprising:
   an oligomer represented by the following Formula 1;
   a polymerization initiator;
   a non-aqueous solvent; and
   a lithium salt:

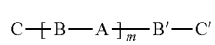
   [Formula 1]

wherein in Formula 1,
   A is a unit comprising a polycarbonate group,
   B and B' are each independently a unit comprising an amide group,
   C and C' are each independently a unit comprising a (meth)acrylate group, and
   m is an integer of 1 to 200;
   wherein the unit A is a unit represented by the following Formula A-1 or A-2:

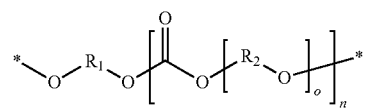
   [Formula A-1]

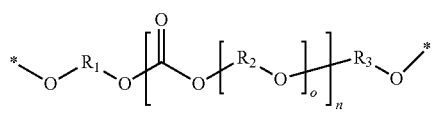
   [Formula A-2]

wherein in Formulae A-1 and A-2, $R_1$, $R_2$ and $R_3$ are each independently a substituted or unsubstituted alkylene group of 1 to 10 carbon atoms, n is an integer of 5 to 3000, and o is 2.

2. The composition according to claim 1, wherein the composition further comprises a monomer containing at least one functional group selected from the group consisting of an acrylate group, a vinyl group, an epoxy group, an amino group, an amide group, an imide group, a hydroxyl group, a methylol group and a carboxyl group.

3. The composition according to claim 1, wherein the units B and B' each independently comprise a unit represented by the following Formula B-1:

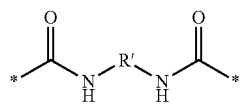
   [Formula B-1]

wherein in Formula B-1,
   R' is at least one selected from the group consisting of a substituted or unsubstituted alkylene group of 1 to 10 carbon atoms, a substituted or unsubstituted cycloalkylene group of 3 to 10 carbon atoms, a substituted or unsubstituted bicycloalkylene group of 6 to 20 carbon atoms, a substituted or unsubstituted arylene group of 6 to 20 carbon atoms, a unit represented by the following Formula R'-1, and a unit represented by the following Formula R'-2:

[Formula R'-1]

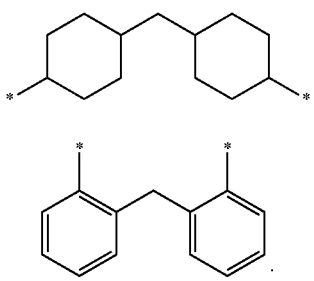

[Formula R'-2]

4. The composition according to claim 3, wherein R' comprises at least one selected from the units represented by the following Formulae R'-3 to R'-8:

[Formula R'-3]

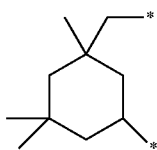

[Formula R'-4]

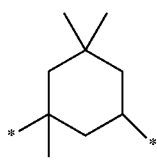

[Formula R'-5]

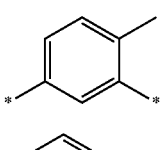

[Formula R'-6]

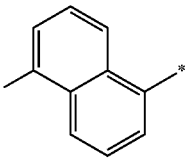

[Formula R'-7]

[Formula R'-8]

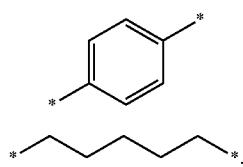

5. The composition according to claim 3, wherein in Formula B-1, R' is a substituted or unsubstituted alkylene group of 1 to 10 carbon atoms.

6. The composition according to claim 3, wherein in Formula B-1, R' is a substituted or unsubstituted cycloalkylene group of 3 to 10 carbon atoms.

7. The composition according to claim 3, wherein in Formula B-1, R' is a substituted or unsubstituted bicycloalkylene group of 6 to 20 carbon atoms.

8. The composition according to claim 3, wherein in Formula B-1, R' is a substituted or unsubstituted arylene group of 6 to 20 carbon atoms.

9. The composition according to claim 3, wherein in Formula B-1, R' is a unit represented by the Formula R'-1

[Formula R'-1]

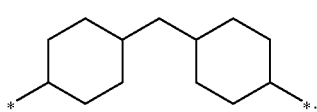

10. The composition according to claim 3, wherein in Formula B-1, R' is a unit represented by the following Formula R'-2:

[Formula R'-2]

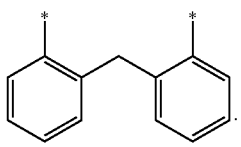

11. The composition according to claim 1, wherein C and C' are each independently selected from the units represented by the following Formulae C-1 to C-5:

[Formula C-1]

[Formula C-2]

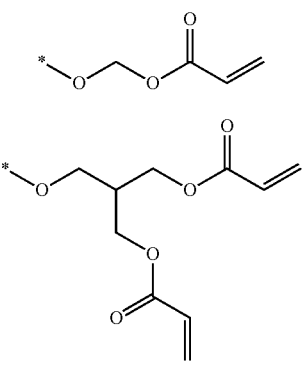

[Formula C-3]

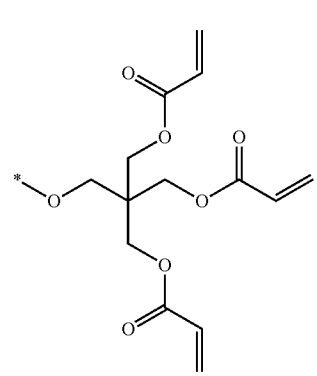

-continued

[Formula C-4]

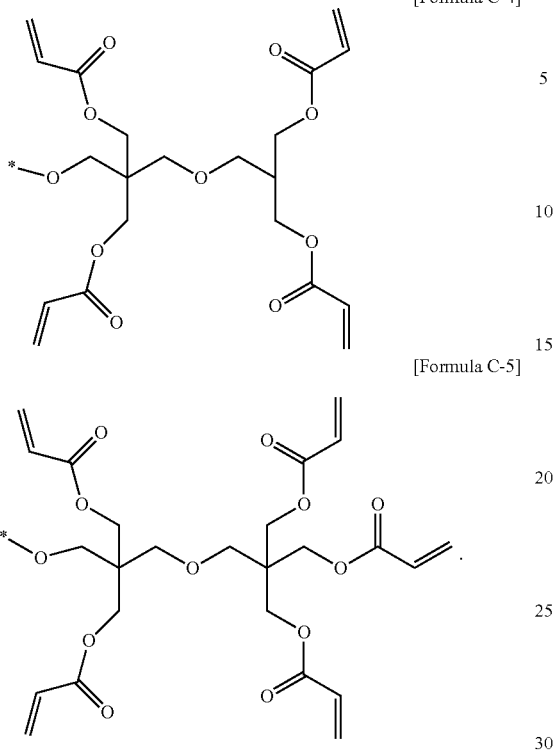

[Formula C-5]

12. The composition according to claim 1, wherein the oligomer is a compound selected from the group consisting of the compounds represented by the following Formulae 1-1 and 1-2:

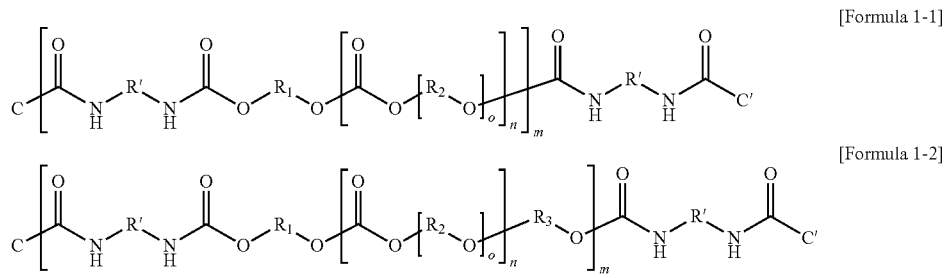

[Formula 1-1]

[Formula 1-2]

wherein in Formulae 1-1 and 1-2,

C and C' are each independently a unit comprising a (meth)acrylate group, $R_1$, $R_2$ and $R_3$ are each independently a substituted or unsubstituted alkylene group of 1 to 10 carbon atoms, R' is at least one selected from the group consisting of a substituted or unsubstituted alkylene group of 1 to 10 carbon atoms, a substituted or unsubstituted cycloalkylene group of 3 to 10 carbon atoms, a substituted or unsubstituted bicycloalkylene group of 6 to 20 carbon atoms, a substituted or unsubstituted arylene group of 6 to 20 carbon atoms, a unit represented by the following Formula R'-1, and a unit represented by the following Formula R'-2, and m is an integer of 1 to 200, n is an integer of 5 to 3000, and o is 2.

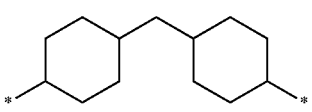

[Formula R'-1]

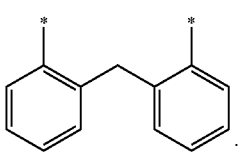

[Formula R'-2]

13. The composition according to claim 1, wherein the oligomer is a compound represented by the following Formula 1-3:

[Formula 1-3]

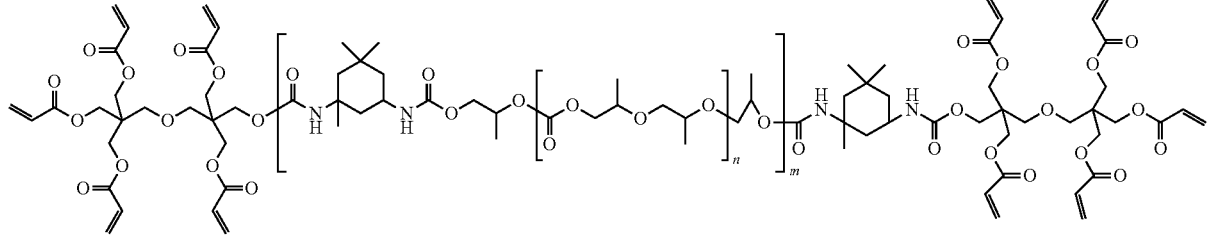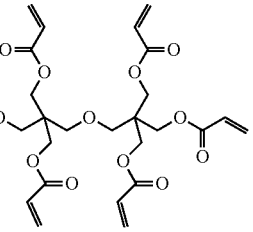

wherein in Formula 1-3, m is an integer of 1 to 200, and n is an integer of 5 to 3000.

14. The composition according to claim 1, wherein the composition for a gel polymer electrolyte further comprises a compound selected from the group consisting of a compound represented by the following Formula 2-1, a compound represented by the following Formula 2-2, and the derivatives thereof:

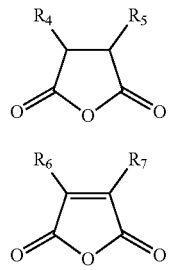

[Formula 2-1]

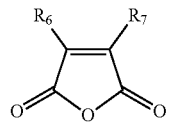

[Formula 2-2]

wherein in Formulae 2-1 and 2-2, $R_4$ to $R_7$ are the same or different and are each independently hydrogen, halogen, a substituted or unsubstituted, linear or nonlinear alkyl group of 1 to 10 carbon atoms, a substituted or unsubstituted alkoxy group of 1 to 10 carbon atoms, or a substituted or unsubstituted alkenyl group of 2 to 10 carbon atoms.

15. A gel polymer electrolyte prepared using the composition for a gel polymer electrolyte according to claim 1.

16. A lithium secondary battery comprising:
a positive electrode;
a negative electrode;
a separator disposed between the positive electrode and the negative electrode; and
the gel polymer electrolyte according to claim 15.

17. The composition according to claim 1, wherein the unit A is the unit represented by Formula A-1:

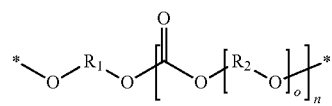

wherein in Formula A-1, $R_2$ and $R_3$ are each independently a substituted or unsubstituted alkylene group of 1 to 10 carbon atoms, n is an integer of 5 to 3000, and o is 2.

18. The composition according to claim 1, wherein the unit A is the unit represented by Formula A-2:

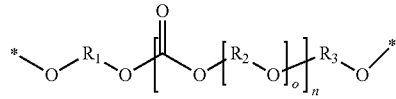

wherein in Formula A-2, $R_1$, $R_2$ and $R_3$ are each independently a substituted or unsubstituted alkylene group of 1 to 10 carbon atoms, n is an integer of 5 to 3000, and o is 2.

* * * * *

UNITED STATES PATENT AND TRADEMARK OFFICE
CERTIFICATE OF CORRECTION

PATENT NO. : 11,658,339 B2  
APPLICATION NO. : 16/638714  
DATED : May 23, 2023  
INVENTOR(S) : Kyoung Ho Ahn et al.

Page 1 of 1

It is certified that error appears in the above-identified patent and that said Letters Patent is hereby corrected as shown below:

On the Title Page

In item (72), the name of the fourth listed inventor "Chui Haeng Lee" should be corrected to
-- Chul Haeng Lee --.

Signed and Sealed this
Twenty-seventh Day of June, 2023

Katherine Kelly Vidal
*Director of the United States Patent and Trademark Office*